United States Patent [19]

Petrofsky et al.

[11] Patent Number: 5,045,333

[45] Date of Patent: Sep. 3, 1991

[54] METHOD FOR SELF-ICING BAKERY GOODS

[75] Inventors: Robert Petrofsky; David Petrofsky, both of St. Louis, Mo.

[73] Assignee: Petrofsky's Enterprises, Inc., St. Louis, Mo.

[21] Appl. No.: 562,732

[22] Filed: Aug. 30, 1990

Related U.S. Application Data

[60] Division of Ser. No. 566,847, Aug. 14, 1990, which is a continuation of Ser. No. 281,198, Dec. 7, 1988, abandoned.

[51] Int. Cl.[5] .............................................. B65B 29/08

[52] U.S. Cl. .................................... 426/394; 426/302; 426/307; 426/113; 426/112; 426/120; 426/128; 426/115; 426/553; 220/521; 220/23.86; 206/219

[58] Field of Search ................. 426/107, 113, 94, 115, 426/120, 124, 112, 128, 90, 283, 302, 307; 220/521, 23.86; 206/219, 221

[56] References Cited

U.S. PATENT DOCUMENTS

| | | | |
|---|---|---|---|
| 197,595 | 11/1977 | Brown | 220/23 |
| 1,760,761 | 5/1930 | March | 426/120 |
| 2,076,132 | 4/1937 | LeRose | 426/120 |
| 2,287,610 | 6/1942 | Guidry | 426/120 |
| 2,510,211 | 6/1950 | Clearly | 426/115 |
| 2,766,796 | 10/1956 | Tupper | 426/120 |
| 2,768,086 | 10/1956 | Billey | 426/90 |
| 2,836,498 | 5/1958 | Fennema | 426/94 |
| 2,965,496 | 12/1960 | Serdar | 426/120 |
| 2,965,501 | 12/1960 | Harriss | 426/120 |
| 3,031,309 | 4/1962 | Bogner et al. | 426/113 |
| 3,182,890 | 5/1965 | Elam | 426/120 |
| 3,305,368 | 2/1967 | Bourelle | 426/120 |
| 3,385,503 | 5/1968 | Stump | 426/120 |
| 3,502,206 | 3/1970 | Hultberg et al. | 206/221 |
| 3,539,354 | 11/1970 | Colvin | 426/113 |
| 3,561,668 | 2/1971 | Bergstrom | 426/124 |
| 4,074,827 | 2/1978 | Labe | 426/104 |
| 4,091,953 | 5/1978 | Daenen | 220/23 |
| 4,133,896 | 1/1979 | Standing et al. | 426/107 |
| 4,233,325 | 11/1980 | Slangan et al. | 426/120 |
| 4,265,919 | 5/1981 | Munter et al. | 426/94 |
| 4,348,421 | 9/1982 | Sakakibara et al. | 426/120 |
| 4,364,963 | 12/1982 | Munter et al. | 426/283 |
| 4,482,047 | 11/1984 | Ackerman | 426/120 |
| 4,496,816 | 1/1985 | McNamara | 426/234 |
| 4,596,713 | 6/1986 | Burdette | 426/120 |
| 4,794,008 | 12/1988 | Schmidt et al. | 426/115 |
| 4,803,088 | 2/1989 | Yamamoto et al. | 426/120 |
| 4,806,371 | 2/1989 | Mendenhall | 426/107 |

FOREIGN PATENT DOCUMENTS

| | | | |
|---|---|---|---|
| 138016 | 6/1934 | Austria | 206/221 |
| 2728940 | 1/1979 | Fed. Rep. of Germany | 426/120 |
| 2810175 | 9/1979 | Fed. Rep. of Germany | 426/115 |
| 1382148 | 8/1963 | France | 426/115 |
| 1451094 | 9/1976 | United Kingdom | 426/120 |

OTHER PUBLICATIONS

Modern Packaging 8/54 p. 79.

*Primary Examiner*—Steven Weinstein
*Attorney, Agent, or Firm*—Armstrong, Teasdale, Schlafly, Davis & Dicus

[57] ABSTRACT

A container of ingredients for an iced bakery good, and a method of icing a bakery good. The container comprises a first compartment which can hold batter or dough which can be frozen or cooled, and can hold the batter or dough during baking, or can also hold a pre-baked bakery good. A second compartment is removably attached to the first compartment and has a layer of icing, which can be frozen or cooled, on a surface thereof. After baking the batter or dough in the batter compartment, or heating the pre-baked good, to form an uniced bakery good, the bakery good can be iced by orienting the second compartment over the first compartment with the layer of icing facing a surface of the uniced bakery good. Heat rises from the baked good and heats the icing. The icing separates substantially from the suface of the second compartment and coats a substantial portion of the bakery good surface. Methods of placing an icing support surface above a bakery good, and separating the icing so that it coats the bakery good are also disclosed.

12 Claims, 1 Drawing Sheet

FIG. 1.
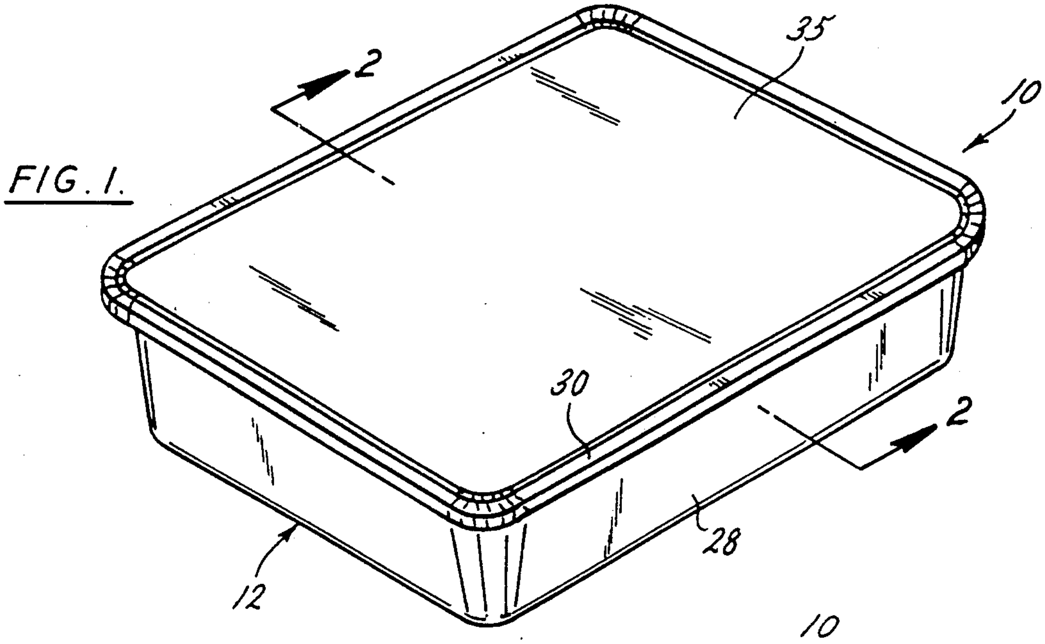
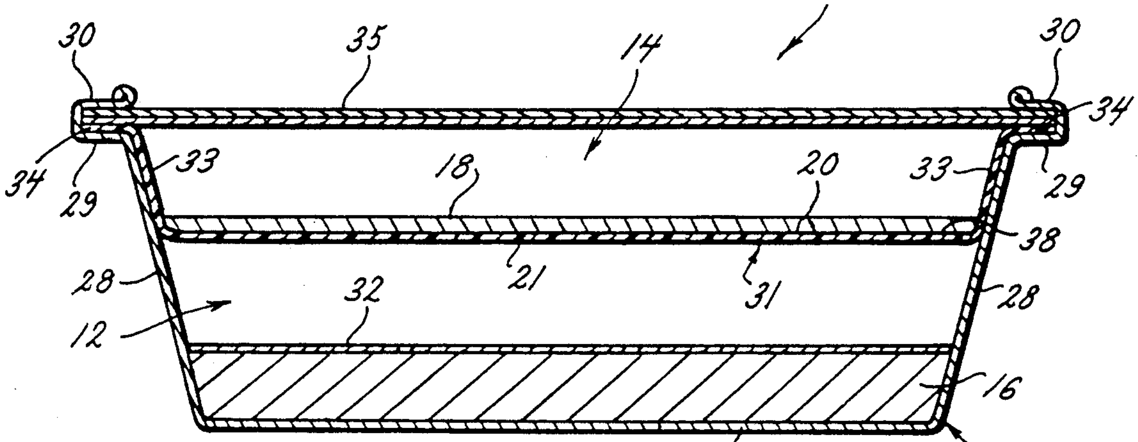
FIG. 2.
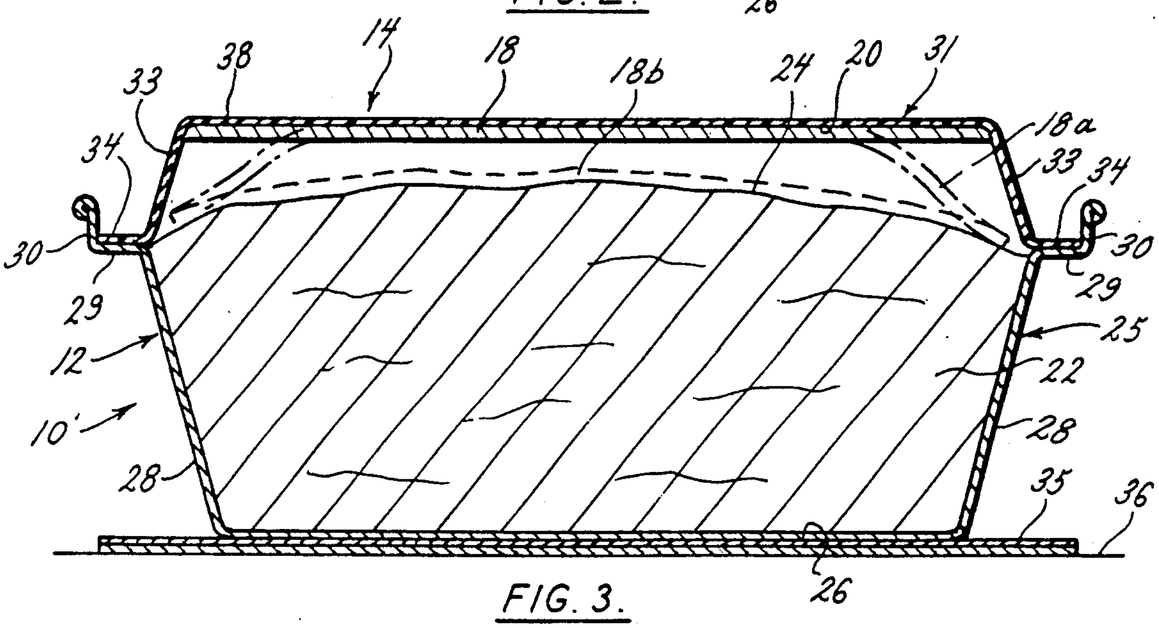
FIG. 3.

METHOD FOR SELF-ICING BAKERY GOODS

CROSS-REFERENCE TO RELATED APPLICATIONS

This is a divisional application of Ser. No. 07/566,847, having a filing data of Aug. 14, 1990, entitled Self-Icing Bakery Goods and Related Methods, which is a file wrapper continuation of Ser. No. 07/281,198, entitled Self-Icing Bakery Goods and Related Methods, having a filing data of Dec. 7, 1988, now abandoned.

BACKGROUND OF THE INVENTION

1. Field of the Invention

The present invention relates to bakery goods, and more particularly to products and methods related to icing of freshly baked bakery goods.

2. Description of the Prior Art

Demand for fresh "home" baked style products which involve simple, effortless preparation has been ever increasing. In response to such demand, grocery stores have increased their supply and prominence of display of specialty and "gourmet" foods. However, such "fresh" foods have certain drawbacks. In particular, such foods typically are not so fresh as to be still "warm from the oven." In addition, such foods generally also have very limited shelf-life. Thus, the products cannot be stored at home for extended periods, limiting convenience and requiring either an immediate trip to the store or advance planning.

Accordingly, a variety of frozen products and mixes are available for home baking. However, such products often involve extensive procedures and mess. Moreover, iced bakery goods ordinarily involve the especially cumbersome step of icing the item. Many people find icing of bakery items particularly disagreeable in that it is messy and requires washing of at least a spatula and mixing bowl, and because even distribution of the icing is often difficult to achieve. As a result, simpler and less troublesome frozen products for home baking of iced bakery goods are desired.

SUMMARY OF THE INVENTION

Briefly, therefore, the present invention is directed to a novel container of ingredients for an iced bakery good. The container comprises a first compartment holding batter, or dough. The first compartment is shaped to hold the batter during baking to contain the baked product. The container has a second compartment being removably attached to the first compartment and having a cooled layer of icing on a surface thereof. After baking of the batter in the batter compartment to form an uniced bakery good, the bakery good can be iced simply by orienting the second compartment over the first compartment with the layer of icing facing a surface of the uniced bakery good. Such orientation allows the heat from the baked good to cause the icing to separate substantially from the surface of the second compartment and to coat a substantial portion of the surface of the bakery good. If desired, the container can be initially assembled with the second compartment oriented relative to the first compartment so that the icing initially faces the batter. Initially the batter and the icing can be frozen, or if not frozen, is cooled in a range of just above freezing to about 50° F. (10 C).

The first compartment can also hold a precooked bakery good, such as cinnamon rolls. After heating of the precooked good, the bakery good can also be iced by orienting the second compartment over the first compartment in the same way discussed above to ice the bakery good.

The present invention is also directed to a novel method for baking and icing a bakery good. The method comprises baking frozen batter for a period of time to bake said batter to produce an uniced bakery good, or heating a precooked bakery good. Then follows placing over the bakery good an icing support surface coated with a layer of icing facing an exposed surface of the bakery good so that the heat from the baked good causes the icing to separate from the icing support surface, thereby tending to coat substantially the surface of the bakery good.

Among the several advantages found to be achieved by the present invention, therefore, may be noted the provision of a self-contained frozen bakery item that may be baked or heated and iced simply and easily without standard icing steps; the provision of such item which provides a relatively even icing over the item; and the provision of a method for preparing such item simply and easily.

BRIEF DESCRIPTION OF THE DRAWINGS

FIG. 1 is an isometric projection of a container of this invention;

FIG. 2 is a cross-sectional view taken along line 2—2 of FIG. 1; and FIG. 3 is a cross-sectional view of a the container of this invention after baking of the batter within the container, and with phantom lines showing various stages of the layer of icing separating from the top of the container.

Corresponding reference characters indicate corresponding parts throughout the several views of the drawings.

DESCRIPTION OF THE PREFERRED EMBODIMENTS

First a general overall description is given. Referring to the drawings, a container 10 holds ingredients for an iced bakery good such as a cake or a danish pastry. This description is given with regard to frozen batter and icing, although the batter or other dough product, and icing can be cooled above freezing in a range up to about 50° F. (10° C). This illustration will first be given with reference to batter that is baked to form a bakery good. However, doughs such as yeast raised dough, chemically leavened dough, and pastry dough, can also be used. The container 10 comprises a first batter compartment 12 and a second compartment 14 thereabove. (See FIG. 2). The batter compartment holds frozen batter 16 and is designed for holding the batter 16 during baking of the batter 16. The second compartment 14 is removably attached to the first batter compartment 16 and has a frozen layer of icing 18 on a surface 20 of a floor 21 of the second compartment 14 such that after baking of the batter 16 in the batter compartment 12 to form an uniced baked bakery good (shown in FIG. 3 as 22), the baked good can be iced by reversing the relative orientation of the batter compartment 12 and the second compartment 14 from the FIGS. 1 and 2 position to the FIG. 3 position to orient the second compartment 14 over the batter compartment 12 with the layer of icing 18 facing a surface 24 of the uniced bakery good 22. The icing 18 is warmed by heat released by the cooling bakery good 22 and separates substantially from the surface 20 of the second compartment 14 by gravity. The layer of icing 18 therefore lands on the baked good 22, coating a substantial portion of its surface 24.

More specifically, the batter compartment 12 is formed of aluminum or other material acceptable for use as a baking container and comprises an integral tray 25 having a floor 26 bordered by an upwardly surrounding wall 28 and an open top. At the top of wall 28, a shoulder flange 29 projects outwardly, and bends upwardly then inwardly to form a lock flap 30. Preferably, the flap 30 is formed of a flexible material such as thin aluminum to permit facile folding over of the flap 30. As shown in FIG. 1, batter compartment 12 is a rectangular cake tin, but may be circular or another desired shape. Batter compartment 12 serves not only to hold frozen batter, but also serves as a baking container. Accordingly, for conventional ovens, batter compartment 12 may be made of, for example, aluminum. On the other hand, if a microwave recipe is used, the batter compartment 12 would be formed of a microwave acceptable material.

The frozen batter 16 forms a layer on the bottom surface 26 of the batter compartment. In order to retain moisture within the batter 16, a moisture resistant layer 32, such as a sheet of wax paper or plastic wrap, may be placed over the batter 16 in batter compartment 12.

The second compartment 14 corresponds generally to the shape of the batter compartment 12 so that it may be oriented to be removably secured at its periphery to the shoulder flange 29 and flap 30, while the layer of icing 18 is spaced above the floor 26 and the frozen batter 16.

The second compartment 14 likewise comprises an integral tray 31, with an upstanding perimeter wall 33 extending integrally from floor 21. A perimeter flange 34 projects outwardly from the top of wall 33, and fits within the first compartment shoulder 29 and the shoulder s bent-over flap 30, to be securely held therebetween. The size of tray 31 and the slant of wall 33 is such that tray 31 fits telescopically within tray 25 when in the position of FIGS. 1 and 2.

The second compartment 14 may be removed from the batter compartment 12 by unbending the flaps 30, and lifting tray 31 upwardly. The second compartment may be formed of any of a variety of materials, but clear, colorless, rigid plastic is especially desirable since it is inexpensive, lightweight and is transparent. Transparency allows simple visual inspection of the condition of the icing and bakery good.

To form a compact container, the second compartment 14 may be oriented in a first position with respect to the batter compartment 12, as shown in FIG. 2. In the first position, the second compartment 14 covers the open top of the batter compartment 12 so that the surface 20 is situated within the batter compartment 12 and the layer of icing 18 faces away from the frozen batter 16. In this position, cover 35 in the form of a flat lid is removably securable over the second compartment 14 opposite the batter compartment 12 to protect the icing 18.

As shown in FIGS. 1 and 2, the shape of the cover 35 corresponds to the open top of the batter compartments 12 and 14 so that its periphery rests on shoulder flange 34 to form an enclosed container. The cover 35 is secured to the compartment 12 by bending lock flaps 30 over both shoulder flanges 29 and 34. It is preferred that the cover 35 be formed of heat insulative material such as flat cardboard or paperboard with a foil laminate so that the cover 35 may be placed on a countertop 36 and, after baking of the batter 16, the batter compartment 12 containing the hot bakery good may be placed on the cover 35 for cooling of the bakery good without injury to the countertop 36. See FIG. 3. The side of the cover 35 that is exposed when sealed over the opening of the batter compartment may be adorned with a label identifying the products and bearing advertising and information as to the manufacturer, ingredients, etc.

It is believed that the specific nature of the batter is not significant, and that almost any batter would be acceptable. Particular batters suitable for icing according to this method include high ratio cake batter and danish pastry dough. Typical of such batters are those prepared from the following recipes.

Devil's Food Cake

Add cake flour (7 lbs.) and cake shortening (4 lbs. 13 oz.) to a large container and with a large electric blender, beat the mixture at a middle speed for five minutes, scraping down the sides of the container at least once. Then add sugar (12 lbs. 4 oz.), salt (5.25 oz.), baking powder (5.25 oz.), baking soda (1.75 oz.), cocoa (1 lb. 12 oz.) and cinnamon (0.75 oz.) to the container, followed by Coffee Rich R (about 12 oz.) and water (2 lbs. 3 oz.). Mix the ingredients at the middle speed until the mixture is smooth, scraping down once. Then add additional Coffee Rich (about 5.5 oz) and water (1 lb. 1.5 oz.) and mix at the moderate speed for about five minutes. After that, add eggs (3 lbs. 4.5 oz.), vanilla (0.5 oz.), and additional Coffee Rich (about 13 oz.) and water (about 2 lbs. 7.25 oz.) to the mixture and mix at the middle speed until the mixture becomes smooth and relatively homogeneous. Add additional eggs (3 lbs. 4.5 oz.), vanilla (0.5 oz.), Coffee Rich (about 13.25 oz.) and water (about 2 lbs. 7.5 oz.) and mix at a slow speed for five minutes.

Yellow Dough Cake

Add cake flour (8 lbs. 12 oz.) and cake shortening (4 lbs. 13 oz.) to a large container and with a large electric blender, beat the mixture at a middle speed for five minutes, scraping down the sides of the container at least once. Then add sugar (12 lbs. 4 oz.), salt (5.25 oz.) and baking powder (8.75 oz.)to the container, followed by Coffee Rich R (about 1 lb. 2.5 oz.) and water (1 lb. 12 oz.). Mix the ingredients at the middle speed until the mixture is smooth, scraping down once. Then add additional Coffee Rich (about 9.5 oz) and water (14 oz.) and mix at the moderate speed for about five minutes. After that, add eggs (2 lbs. 10 oz.), vanilla (0.5 oz.), and additional water (2 lbs. 6.5 oz.) to the mixture and mix at the middle speed until the mixture becomes smooth and relatively homogeneous. Add additional eggs (about 2 lbs. 10 oz.), vanilla (0.5 oz.) and water (about 2 lbs. 6.5 oz.) and mix at a slow speed for five minutes.

A portion of such batter is poured into the batter compartment of this invention. For example, where yellow cake batter is used, and the batter compartment measures about 7.5"×5.25"×1.75" deep, enough batter to form a layer about ½" deep is added.

Similarly, almost any type icing may be employed, and the specific icing to be used may be dictated by taste. However, it has been found that because the icing is heated by the cooling bakery good, the icing should have a high fat level, especially about 15% by weight or greater, in order to avoid crystallization of the icing. A typical icing may be prepared as follows:

A syrup of water (10 lbs.), corn syrup (4 lbs.) and sugar (6 lbs.) may be used to thin the icing and to bring a shiny finish to the icing.

Glazing can also be used as the icing is used, and also other flavoring substances that will adhere to the second compartment can be used as the icing is used.

The thickness of the layer of icing 18 may be dictated by taste. Since the surface 24 of the bakery good 22 is often curved, in many cases the surface 24 of the bakery good is greater than the surface 20 to which the layer of icing 18 adheres before application to the bakery good 24. Therefore, in selecting the thickness of the layer of icing 18, it should be considered that the layer may spread over a wider area, reducing the thickness of the layer as it coats the surface 24 of the bakery good 22. Generally layers of ⅛" to ¼ " before application to the bakery good 22 have been found to be suitable where the bakery good is a cake.

Thus, the container of this invention can be employed as follows. A consumer receives from a store a container as shown in FIGS. 1 and 2. The container holds frozen batter and icing as described above. When it is desired to bake the bakery good, the container is removed from the freezer. The lock flaps 30 are unfolded, and the cover 35, the second compartment 14 and the moisture resistant layer 32 are removed from the batter compartment 12 and set aside, allowing the icing to thaw.

While the icing is thawing, the batter compartment 12 is placed in an oven. It has been found that superior results are obtained if the batter compartment 12 is placed in a cold oven and the oven then set at a lower temperature for a period of time, and then reset at a higher temperature. This approach has been found to avoid the uneven baking which otherwise tends to result from baking frozen batter. Thus, for example, the batter compartment is placed on a cookie sheet on the center rack of a cold oven. The oven can be such as a General Electric P7 electric oven with dimensions of about 19 inches wide, 15 inches tall and 19 inches deep. The oven is then set to about 260° F. for about 15 minutes, and then reset to about 325° F. and baking is continued for about 20 additional minutes, until the batter has been adequately baked and has risen to form a baked bakery good 22.

The batter compartment 12 is thereupon removed from the oven, and placed on a heat insulative surface (such as the cover 35) for cooling. The second compartment 14 with its thawing layer of icing 18 is then flipped over and placed over the hot, but cooling, uniced, bakery good 22, as shown in FIG. 3. In this position, the shoulders 29 and 34 abut to form an enclosed container 10'. The layer of icing 18 faces bakery good surface 24. Over the next 3 to 5 minutes or so, warmed by the heat emanating from the bakery good 22, the icing 18 separates from the surface 20, and falls to coat surface 24, as shown in phantom lines in FIG. 3. Layer **18*a* shows the layer of icing 18 in the process of separating from surface 20. As shown in the phantom lines of the layer 18*a*, separation typically begins along the periphery of the layer of icing 18** and continues to the center of the layer.

As can be seen from FIG. 3, the shape of the first and second trays 25 and 31, including the height of their respective walls 28 and 33, are such that the icing 18 is spaced from the surface 24 of the baked good before the icing separates from floor 21. This prevents icing sticking to the floor 21 upon removal of tray 31.

The phantom lines of layer **18*b* show the layer of icing 18 as it coats the layer 24 of the baked good 22. It has been found that a thin layer of edible releasing material 38, such as an edible mineral oil, between the surface 20 and the layer of icing 18, aids in the separation of the layer of icing 18 from the surface 20. In addition, for reasons of visual and taste esthetics, the oil should be unflavored and should be a type that will not tend to cloud up upon freezing, thawing, or during the icing step. It has been found that although shortening or soybean oil tends to cloud, mineral oil remains clear. After the icing 18 separates from tray 31, tray 31** can be removed and the baked and iced good can be served.

It has also been discovered that the icing maintains sufficient viscosity to avoid open patches in coverage which could result from insufficiently viscous icing running completely away from the high spots of the surface 24 of the bakery good 22. Moreover, even if certain areas, for example, corners or edges, are left uncovered, slight tilting and jiggling of the container has been found to aid in obtaining complete coverage, and in the relatively infrequent event that all else fails, a spoon or spatula may be used for touch-ups.

As indicated earlier, the invention can also be used with a pre-cooked bakery good such as cinnamon rolls or the like, which has been pre-baked and then frozen or cooled. In this case, the first compartment 12, rather than containing the frozen batter 16, will contain a frozen prebaked good. This pre-baked good will not rise during baking as the batter does. Hence, the pre-baked good can extend to a height within the first compartment 12 that is closer to the floor 21 of the second compartment 14 than shown for the batter 16 in FIG. 1.

The pre-baked good is iced in the same way as heretofore described in that the first compartment 12 is placed in an oven with the pre-cooked bakery good, and the oven heated at a temperature suitable for the size of the good for sufficient time to heat the pre-baked good to the desired degree of warmth. The first compartment 12 is then removed from the oven and placed on the cover 35, for cooling. The second compartment 14 with its icing layer 18 is placed over the hot pre-cooked bakery good in the same fashion as shown in FIG. 3 as heretofore described. The icing 18, warmed by the heat of the bakery good, separates from surface 20 and coats the surface of the bakery good.

If desired, the container 10 can be in the form of the second compartment initially oriented such as shown in FIG. 3, so that the icing 18 and inside compartment surface 20 face the batter 16. The moisture resistant layer 32 and cover 35 can be eliminated. With the modified container, the flaps 30 would be down from their FIG. 3 position. The second compartment 14 would be of heat resistant material, such as tin foil, for a conventional oven. For a microwave oven, the first and second compartment would be of microwave acceptable material The modified container would be placed in the oven and heated for the desired time period, which time period could be sufficient for the icing to separate from the second container and coat the bakery good, such as in a microwave oven. Alternately, the container could be removed before the icing separates. This modified container would be more desirable for a pre-baked good and a microwave oven.

However, the preferred embodiment has the advantage, that should the container be warmed to increase the viscosity of the icing, the icing 18 will not flow out of the second compartment 14 before it is intended to do so. With the modification having the second compartment 14 initially facing the batter or baked good, if the icing 18 is warmed sufficiently during shipping or handling prior to the time for use, the icing could fall on the batter and thus be prevented from being applied in the intended way.

In view of the above, it will be seen that the several advantages of the invention are achieved and other advantageous results attained.

As various changes could be made in the above methods and constructions without departing from the scope of the invention, it is intended that all matter contained in the above description and shown in the accompanying drawings shall be interpreted as illustrative and not in a limiting sense.

We claim:

1. A method for baking and icing a bakery product comprising:

(a) placing a non-prebaked dough or batter in a first tray having a floor and an upstanding wall extending therefrom defining a first compartment;

(b) adhering to the inside surface of the floor of a second tray having a floor and an upstanding wall extending therefrom defining a second compartment, an icing composition compatible with the bakery product to be produced;

(c) positioning the second tray in a first position relative to the first tray so that the second tray is removably attached and supported on the first tray with the floor of the second tray being located between the icing and the dough or batter and spaced above the dough or batter;

(d) separating the first tray from the second tray;

(e) placing the separated first tray containing said dough or batter in an oven and baking the dough or batter contained in said separated first tray in the oven to form a baked product while the second tray containing said adhered icing remains outside the oven, and upon completion of baking;

(f) removing the first tray containing said baked product from said oven and then inverting said second tray from its first position and then, while said baked product still has heat emanating from it from the baking step, placing said second tray in its inverted position on said first tray so that the floor of said second tray is positioned not between the icing and the baked product but above both the icing and the baked product and the icing is spaced from the top surface of the baked product;

(g) and allowing said heat emanating from said bakery product to warm said icing to allow the icing to separate from said floor of said second tray and fall to the top surface of the bakery product and coat a substantial portion of the surface of the bakery product.

2. The method for baking and icing the bakery product of claim 1, further comprising in the step of removing the first tray from the oven and inverting the second tray from its first position, the placing of said second tray in its inverted position on said first tray to form an enclosed container within which the icing and baked product are positioned, to better allow the heat emanating from the bakery product to be transferred to the icing to more quickly warm the icing to allow the icing to separate from the floor to the second tray.

3. The method for baking and icing the bakery product of claim 1, wherein the wall of the first container has an edge with a shoulder extending about the edge, and the wall of the second container has an edge with a shoulder extending about the edge, and further comprising in the step of removing the first tray, the placing of said second tray in its inverted position on said first tray so that the shoulder of the first tray abuts the shoulder of the second tray to form an enclosed container to better allow the heat emanating from the bakery product to be transferred to the icing to more quickly warm the icing to allow the icing to separate from the floor of the second tray.

4. The method for baking and icing the bakery product of claim 3, wherein in the step of positioning the second tray in a first position relative to the first tray, the said positioning is such that the shoulder of the second tray is positioned to be supported by the shoulder of the first tray.

5. The method for baking and icing a bakery product of claim 4, wherein the shoulder of the first tray has a flap that extends above the shoulder of the second tray to help hold the two trays together when the second tray and first tray are in the first position, and further comprising in the step of separating the first tray from the second tray, the step of moving the said flaps to allow the shoulder of the second tray to be removed through the open flaps to be separated from the first tray.

6. The method for baking and icing the bakery product of claim 5, further comprising the step of placing a heat insulative cover over the second tray when the second tray is in the said first position relative to the first tray, the step of positioning the flap too extend above the cover, and further comprising the step of positioning the flap to allow the cover to be separated therefrom, and separating the said cover from the first tray and placing the said insulative cover outside of the oven prior to the step of placing the first tray within the oven for baking the dough or batter, and further the step of removing the first tray from the oven and placing the first tray on the heat insulative cover while the first tray is warm from the oven.

7. A method for heating and icing a bakery product comprising:

(a) placing a cooled prebaked bakery product in a first tray having a floor and an upstanding wall extending therefrom defining a first compartment;

(b) adhering to the inside surface of the floor of a second tray having a floor and an upstanding wall extending therefrom defining a second compartment, an icing composition compatible with the bakery product to be produced;

(c) positioning the second tray in a first position relative to the first tray so that the second tray is removably attached and supported on the first tray with the floor of the second tray being located between the icing and the prebaked product and spaced above the prebaked product;

(d) separating the first tray from the second tray;

(e) placing the separated first tray containing said prebaked product in an oven and heating the prebaked product contained inn said separated first tray inn the oven to heat the product while the second tray containing said adhered icing remains outside the oven, and upon completion of heating the product;

(f) removing the first tray containing said heated baked product from said oven and then inverting said second tray from its first position and then, while said baked product still has heat emanating from it from the heating step placing said second tray in its invented position on said first tray so that the floor of said second tray is positioned not between the icing and the baked product but above both the icing and the baked product and the icing is spaced from the top surface of the baked product;

(g) and allowing said heat emanating from said bakery product to warm said icing to allow the icing to separate from said floor of said second tray and fall to the top surface of the bakery product and coat a substantial portion of the surface of the bakery product.

8. The method for heating and icing the bakery product of claim 7 further comprising in the step of removing the first tray from the oven and inverting the second tray from its first position, the placing of said second tray in its inverted position on said first tray to form an enclosed container within which the icing and bakery product are positioned, to better allow the heat emanating from the bakery product too be transferred to the icing to more quickly warm the icing to allow the icing to separate from the floor of the second tray.

9. The method for heating and icing the bakery product of claim 7, wherein the wall of the first container has an edge with a shoulder extending about the edge, and the wall of the second container has an edge with a shoulder extending about the edge, and further comprising in the step of removing the first tray, the placing of said second tray in its inverted position on said first tray so that the shoulder of the first tray abuts the shoulder of the second tray to form an enclosed container to better allow the heat emanating from the bakery product to be transferred to the icing to more quickly warm the icing to allow the icing to separate from the floor of the second tray.

10. The method for heating and icing the bakery product of claim 9, wherein in the step of positioning the second tray in a first position relative to the first tray, the said positioning is such that the shoulder of the second tray is positioned to be supported by the shoulder of the first tray.

11. The method for heating and icing a bakery product of claim 10, wherein the shoulder of the first tray has a flap that extends above the shoulder of the second tray to help hold the two trays together when the second tray and first try are in the first position, and further comprising in the step of separating the first tray from the second tray, the step of moving the said flaps to allow the shoulder of the second tray to be removed through the open flaps to be separated from the first tray.

12. The method for heating and icing the bakery product of claim 11, further comprising the step of placing a heat insulative cover over the second tray when the second tray is in the said first position relative to the first tray, and further comprising the step of positioning the flap to allow the cover to be separated therefrom, and separating the said cover from the first tray and placing the said insulative cover outside of the oven prior to the step of placing the first tray within the oven for heating the bakery product, and further the step of removing the first tray from the oven and placing the first tray on the heat insulative cover while the first tray is warm from the oven.

* * * * *

UNITED STATES PATENT AND TRADEMARK OFFICE
CERTIFICATE OF CORRECTION

PATENT NO. : 5,045,333

DATED : September 3, 1991

INVENTOR(S) : Robert Petrofsky et al

It is certified that error appears in the above—identified patent and that said Letters Patent is hereby corrected as shown below:

Column 8, line 35, (claim 6), "too" should be -- to --;

Column 8, lines 64 and 65 (Claim 7), "inn" (both occurrences) should be -- in --;

Column 9, line 6 (Claim 7) "invented" should be -- inverted --;

Column 9, line 25 (Claim 8), "too" should be -- to --;

Column 10, line 16 (Claim 11), "try" should be -- tray --.

Signed and Sealed this

Twenty-second Day of December, 1992

*Attest:*

DOUGLAS B. COMER

*Attesting Officer*

*Acting Commissioner of Patents and Trademarks*

UNITED STATES PATENT AND TRADEMARK OFFICE

CERTIFICATE OF CORRECTION

PATENT NO. : 5,045,333

DATED : September 3, 1991

INVENTOR(S) : Robert Petrofsky et al

It is certified that error appears in the above-indentified patent and that said Letters Patent is hereby corrected as shown below:

On the title page, item [73] Assignee: "Petrofsky's Enterprises, Inc."

should read:

--Leonard Petrofsky, Robert Petrofsky, and David Petrofsky--

Signed and Sealed this

Twenty-third Day of November, 1993

Attest:

Bruce Lehman

BRUCE LEHMAN

*Attesting Officer* *Commissioner of Patents and Trademarks*